United States Patent
Cadet et al.

(10) Patent No.: US 9,645,285 B2
(45) Date of Patent: May 9, 2017

(54) OPTICAL ARTICLE COMPRISING A SURFACTANT-BASED TEMPORARY ANTIFOG COATING WITH AN IMPROVED DURABILITY

(75) Inventors: Mamonjy Cadet, Charenton le Pont (FR); Annette Cretier, Charenton le Pont (FR); Charlotte Saint-Lu, Charenton le Pont (FR)

(73) Assignee: SATISLOH AG, Barr (CH)

( * ) Notice: Subject to any disclaimer, the term of this patent is extended or adjusted under 35 U.S.C. 154(b) by 391 days.

(21) Appl. No.: 14/234,349

(22) PCT Filed: Jun. 28, 2012

(86) PCT No.: PCT/EP2012/062620
§ 371 (c)(1),
(2), (4) Date: Jan. 22, 2014

(87) PCT Pub. No.: WO2013/013929
PCT Pub. Date: Jan. 31, 2013

(65) Prior Publication Data
US 2014/0177053 A1    Jun. 26, 2014

(30) Foreign Application Priority Data

Jul. 22, 2011 (FR) ...................................... 11 56704
Aug. 8, 2011 (WO) .................. PCT/EP2011/063635

(51) Int. Cl.
| | | |
|---|---|---|
| C09D 171/00 | (2006.01) |
| C09D 171/02 | (2006.01) |
| C09D 183/00 | (2006.01) |
| G02B 1/10 | (2015.01) |
| G02B 27/00 | (2006.01) |
| C08K 5/06 | (2006.01) |
| C08K 5/54 | (2006.01) |
| C08K 5/41 | (2006.01) |
| C08K 5/5415 | (2006.01) |
| C08K 5/5419 | (2006.01) |
| C03C 17/28 | (2006.01) |
| C03C 17/30 | (2006.01) |
| C03C 17/34 | (2006.01) |
| B05D 1/28 | (2006.01) |
| B05D 1/36 | (2006.01) |

(Continued)

(52) U.S. Cl.
CPC ................ G02B 1/10 (2013.01); G02B 1/115 (2013.01); G02B 27/0006 (2013.01); G02C 7/02 (2013.01); B05D 1/28 (2013.01); B05D 1/36 (2013.01); B29D 11/00865 (2013.01); C03C 17/28 (2013.01); C03C 17/30 (2013.01); C03C 17/3405 (2013.01); C03C 2217/75 (2013.01); C03C 2218/10 (2013.01); C03C 2218/11 (2013.01); C03C 2218/30 (2013.01); C03C 2218/31 (2013.01); C08G 2290/00 (2013.01); C08K 5/06 (2013.01); C08K 5/41 (2013.01); C08K 5/54 (2013.01); C08K 5/5415 (2013.01); C08K 5/5419 (2013.01); C09D 171/00 (2013.01); C09D 171/02 (2013.01);

C09D 183/00 (2013.01); Y10T 428/31536 (2015.04); Y10T 442/2213 (2015.04)

(58) Field of Classification Search
None
See application file for complete search history.

(56) References Cited

U.S. PATENT DOCUMENTS

| | | | | |
|---|---|---|---|---|
| 4,837,078 A | * | 6/1989 | Harrington | ............... B32B 5/26 442/334 |
| 5,687,445 A | * | 11/1997 | Hocking | .............. G02C 13/006 15/104.93 |
| 5,997,621 A | | 12/1999 | Scholz et al. | .................... 106/13 |
| 6,109,430 A | * | 8/2000 | Bando | .................. A47K 10/421 206/207 |
| 6,251,523 B1 | | 6/2001 | Takahashi et al. | ........... 428/428 |
| 6,379,776 B1 | | 4/2002 | Tada et al. | .................... 428/149 |
| 6,384,120 B1 | * | 5/2002 | Hoga | ................... A01G 9/1438 524/111 |
| 2006/0167153 A1 | * | 7/2006 | Schneider | ................ C08K 5/06 524/376 |
| 2006/0203031 A1 | * | 9/2006 | Parazak | ................. C09D 11/38 347/28 |
| 2006/0257281 A1 | * | 11/2006 | Weide | .................... A61K 31/00 422/6 |
| 2007/0141358 A1 | * | 6/2007 | Jallouli | ................... B24B 9/146 428/426 |
| 2009/0324964 A1 | * | 12/2009 | Jaynes | .................. C08F 220/56 428/426 |
| 2012/0019767 A1 | * | 1/2012 | Cadet | ..................... C03C 17/30 351/62 |

(Continued)

FOREIGN PATENT DOCUMENTS

| | | |
|---|---|---|
| EP | 0 871 046 | 10/1998 |
| EP | 1 275 624 | 1/2003 |

(Continued)

OTHER PUBLICATIONS

"Zonyl(R) to Capstone(R) Fluorosurfactant & Repellent Transition Guide" (http://web.chempoint.com/cn/aoq4y/Zonyl-Capstone) (webpage retrieved Dec. 16, 2015).*

(Continued)

Primary Examiner — Vivian Chen
(74) Attorney, Agent, or Firm — Norton Rose Fulbright US LLP

(57) ABSTRACT

The present invention relates to an optical article comprising a substrate coated with a coating preferably comprising silanol groups on its surface and, directly contacting this coating, an antifog coating precursor coating, said precursor coating preferably having a static contact angle with water of more than 10° and of less than 50° and being obtained through the grafting of at least one organosilane compound possessing a polyoxyalkylene group and at least one silicon atom bearing at least one hydrolyzable group, and is further coated with a film obtained by applying a composition containing at least one surfactant of formula $F(CF_2)_y-(CH_2-CH_2O)_{x+1}H$ (VIII), wherein x is an integer ranging from 1 to 14, y is an integer lower than or equal to 10, compounds of formula (VIII) in which y=6 representing at (Continued)

least 90% by weight by weight, relative to the weight of compounds (VIII) present in the composition, so as to form an antifog coating, having preferably a static contact angle with water lower than or equal to 10°.

21 Claims, No Drawings

(51) Int. Cl.
  *G02B 1/115* (2015.01)
  *G02C 7/02* (2006.01)
  *B29D 11/00* (2006.01)

(56) References Cited

U.S. PATENT DOCUMENTS

2012/0045577 A1* 2/2012 Feret .................... C08G 65/336 427/162

FOREIGN PATENT DOCUMENTS

| EP | 1 324 078 | | 7/2003 |
|----|-----------|---|--------|
| FR | 2974904 | | 11/2012 |
| JP | 2001-190471 | * | 7/2001 |
| JP | 2002-004170 | | 1/2002 |
| JP | 2004-317539 | * | 11/2004 |
| JP | 2005-281143 | | 10/2005 |
| JP | 2009-195648 | * | 9/2009 |
| WO | WO 97/43668 | | 11/1997 |
| WO | WO 2004/022639 A | * | 3/2004 |
| WO | WO 2007/071700 | | 6/2007 |
| WO | WO 2011/080472 | | 7/2011 |

OTHER PUBLICATIONS

"Dupont Capstone FS-3100" (Dec. 2010).*
International Search Report issued in PCT Application No. PCT/EP2012/062620, mailed Sep. 21, 2012.

* cited by examiner

OPTICAL ARTICLE COMPRISING A SURFACTANT-BASED TEMPORARY ANTIFOG COATING WITH AN IMPROVED DURABILITY

CROSS-REFERENCE TO RELATED APPLICATIONS

This application is a national phase application under 35 U.S.C. §371 of International Application No. PCT/EP2012/062620 filed 28 Jun. 2012, which claims priority to French Application No. 1156704 filed 22 Jul. 2011 and International Application No. PCT/EP2011/063635 filed 8 Aug. 2011. The entire contents of each of the above-referenced disclosures is specifically incorporated by reference herein without disclaimer.

The present invention relates to an optical article, preferably a spectacle lens, comprising an antifog coating precursor coating, characterized in that the antifog coating precursor coating is coated with a composition, preferably a liquid solution, containing at least one surfactant corresponding to formula $F(CF_2)_y$—$(CH_2$—$CH_2O)_{x+1}H$ (VIII), wherein y is an integer lower than or equal to 10 and compounds of formula (VIII), in which y=6 account for at least 90%, preferably at least 95% and more preferably 100% by weight of compounds of formula (VIII) present in the composition; x is an integer ranging from 1 to 14.

The present invention also relates to a method for imparting antifog properties to an optical article, preferably a lens for spectacles, comprising a step for depositing the composition onto the surface of the article, preferably the liquid solution, as hereabove.

The present invention also relates to antifogging tissues impregnated with said composition.

Very numerous supports, such as plastic materials and glass, suffer as a drawback from becoming covered with fog when their surface temperature decreases below the dew point of ambient air. This is especially the case with the glass or organic glass that is used to make glazing for transportation vehicles or buildings, lenses, especially for spectacles, mirrors, and so on. The fogging that develops on these surfaces leads to a decrease in transparency, due to the diffusion of light through water drops, which may cause a substantial discomfort.

To prevent any fog formation in very damp environments, that is to say the condensation of very little water droplets on a support, it has been suggested to apply hydrophilic coatings onto the outer surface of such support, with a low static contact angle with water, preferably of less than 50°, more preferably of less than 25°. Such permanent antifog coatings do act as sponges toward fog and enable the water droplets to adhere to the surface of the support by forming a very thin film that gives an impression of transparency. These coatings are generally made of highly hydrophilic species such as sulfonates or polyurethanes.

Commercially available products comprise several micrometer-thick hydrophilic layers.

As a rule, when the thickness of the coatings is high (several microns), these coatings, as a consequence of water absorption, do swell, soften and become mechanically less resistant.

As used herein, a permanent antifog coating is intended to mean a coating which hydrophilic properties result from hydrophilic compounds permanently bound to another coating or support. The application EP 1324078 describes a lens coated with an abrasion-resistant coating and a multilayered antireflective coating comprising layers with high and low refractive indexes alternating with each other, amongst which the outer layer is a low refractive index layer (1.42-1.48) of from 5 to 100 nm thickness forming an antifog coating consisting in a hybrid layer with a static contact angle with water of less than 10°, obtained through vacuum deposition of both simultaneously an organic compound and silica or of silica and alumina, that is to say through coevaporation of these various components. The antifog coating preferably comprises from 0.02 to 70% by weight of the organic compound relative to the coating total weight, and typically from 6 to 15% by weight, according to the examples.

Said organic compound comprises one hydrophilic group and one reactive group, for example a trialkoxysilyl group having from 3 to 15 carbon atoms, and has preferably a molecular weight ranging from 150 to 1500 g/mol. Some preferred compounds possess a polyether backbone, especially one polyoxyethylene and one reactive group on each end of the molecule. Preferred compounds include polyethylene glycol glycidyl ether, polyethylene glycol monoacrylate and N-(3-trimethoxysilylpropyl)gluconamide.

The antifog coating therefore comes as a silica-based layer (or a silica+alumina-based layer) incorporating one hydrophilic organic compound. However, its antifog character does change over time, and it can be observed a stepwise deterioration of the antifogging properties. When becoming too low, they may be restored through a "washing treatment" of the antifog film, particularly a plasma-mediated treatment.

In the practice, the coevaporation method of the application EP 1324078 is very complicated to implement. It would be preferable to have a method for making an antifog coating without carrying out any coevaporation process.

The U.S. Pat. No. 6,251,523 and U.S. Pat. No. 6,379,776 describe an antireflective, antifog glass for cars or lenses, comprising a glass substrate provided with an antireflective coating based on 110-250 nm-thick silica with a surface roughness Ra of about 5-10 nm, in turn provided with a 8 nm-thick permanent antifog coating obtained through liquid or vapor deposition of the compound $CH_3O$—$(CH_2CH_2O)_{6-9}$—$(CH_2)_3Si(OCH_3)_3$ or a hydrolyzate thereof. At the initial stage, the antifog coating has a static contact angle with water of 3°.

Another solution to combine antireflective and antifogging properties consists in using a thin porous low refractive index layer, partially made of surfactants, which enable the layer to acquire antifogging properties. This layer is generally deposited onto a hydrophilic surface.

Thus, the U.S. Pat. No. 5,997,621 describes a porous antireflective and antifog coating based on metal oxides (silica beads) and relatively water-soluble anionic surfactants, having generally an ionic hydrophilic head of the carboxylic acid, sulfonate or phosphate type and a fluorinated chain. In order to be immobilized on a substrate, the surfactants are preferably able to covalently bind to the metal oxides. The application WO 97/43668 describes a similar construction.

The application EP 0871046 describes an antireflective and antifog system comprising one inorganic oxide-based porous layer deposited onto a few micrometer-thick water absorbing layer, obtained through polycondensation of an inorganic alkoxide hydrolyzate in the presence of a polyacrylic acid compound. The porous layer, which acts as the antireflective barrier, allows water to access the absorbing layer.

Antifogging properties may also be obtained by applying temporary solutions commercially available as sprays or towelettes, onto spectacle lenses comprising as the outer layer an antisoiling coating (hydrophobic and oleophobic), often considered as essential when ophthalmic lenses are provided with an antireflective coating. They make it possible to obtain the antifogging property on a short period of time. The ease of soil removal aspect that is given to the antisoiling coating is preserved, but after a couple of wiping operations, the antifogging property is significantly altered. Indeed, temporary solutions comprise materials that are hydrophilic in nature with poor interactions with the antisoiling coating hydrophobic surface, so that after a few wiping operations, these hydrophilic materials are removed.

A more interesting solution consists in making an antifog coating by applying a temporary hydrophilic solution onto the surface of an antifog coating precursor coating, which represents an alternative to permanent antifog coatings.

The application EP 1275624 describes a lens coated with a hard, inorganic, hydrophilic layer based on metal oxides and silicon oxide. Its hydrophilic nature and the presence of nanosized concave portions on the surface thereof enable to impregnate a surfactant and to retain the same adsorbed over a long period of time, thus maintaining an antifog effect for several days. However, an antifog effect can also be observed in the absence of any surfactant.

The applications JP 2004-317539 and JP 2005-281143 describe a lens coated with a multilayered antireflective coating and/or with an abrasion-resistant coating and with an antifog coating precursor coating, having a static contact angle with water of from 50° to 90°. The antifog coating as such, which is a temporary coating, is obtained after application of a surfactant onto the surface of the precursor coating.

The antifog coating precursor coating is obtained from a composition comprising an organic compound comprising a hydrophilic group of polyoxyethylene nature, a reactive group capable of reacting with the outer layer of the antireflective coating, especially a silica-based layer, such as alkoxysilane $Si(OR)_n$, silanol SiOH or isocyanate groups, and optionally a fluorinated hydrophobic group, and the composition is chosen so that the static contact angle with water of the antifog coating precursor coating varies from 50° to 90°. The organic compounds used in the antifog coating precursor preferably have a molecular weight ranging from 700 to 5000 or from 430 to 3700 g/mol. To be mentioned as examples of such compounds are the $CH_3O(CH_2CH_2O)_{22}CONH(CH_2)_3Si(OCH_3)_3$ or $C_8F_{17}O(CH_2CH_2O)_2CONH(CH_2)_3Si(OCH_3)_3$ compounds. The precursor coating is described as being 0.5 to 20 nm thick. The relatively high contact angle of the precursor coating is expected because it enables, according to these applications, to easily remove soils resulting from the drying of water drops.

The patent application WO 2011/080472 describes a lens for spectacles comprising a substrate provided with a coating comprising silanol groups on the surface thereof and, directly contacting this coating, an antifog coating precursor coating, wherein the antifog coating precursor coating:
- is obtained through the grafting of at least one organosilane compound possessing:
  - a polyoxyalkylene group comprising less than 80 carbon atoms, and
  - at least one silicon atom carrying at least one hydrolyzable group,
- has a thickness lower than or equal to 5 nm,
- has a static contact angle with water of more than 10° and of less than 50°.

The solution which is preferably deposited to provide this surface with antifogging properties is the commercially available solution Defog It™.

The antifogging properties, especially the durability of the antifogging effect associated with the lens precursor coating described in the patent application WO 2011/080472, are very satisfactory.

However, it is desirable to improve the antifogging performances of the lenses for spectacles, which are described in the patent application WO 2011/080472. In particular, layers with more efficient antifogging properties are sought after, which would last longer over time and/or under mechanical stresses, while preserving an acceptable ease of soil removal.

Antifog coatings also having good mechanical properties (abrasion and scratch resistance) are still sought after.

The present invention aims at preparing such temporary antifog coatings, which significantly improve the antifogging property durability over time and/or under mechanical stresses.

It is a further objective of the present invention to provide an antifog coating that would be immediately operational, that is to say a coating which, when a transparent lens substrate coated with such coating is placed under conditions generating fog onto said substrate being devoid of said coating, enables to immediately attain (that is to say in less than one second) a vision>6/10 (visual acuity), and preferably of 10/10, without fog formation for an observer looking through a coated lens according to the Snellen E visual acuity scale (ARMAIGNAC scale (Tridents) (Snellen E) reading at 5 meters, ref. T6 available from FAX INTERNATIONAL), located at a distance of 5 meters.

It is a further objective of the present invention to provide an optical article having both antireflective and antifogging properties.

These objectives may be aimed at, according to the invention, thanks to the application onto the optical article of a composition, preferably a liquid solution, containing at least one surfactant corresponding to formula $F(CF_2)_y—(CH_2—CH_2O)_{x+1}H$ (VIII), wherein y is an integer lower than or equal to 10, compounds of formula (VIII) in which y=6 accounting for at least 90% by weight, preferably at least 95%, more preferably 100% by weight of compounds of formula (VIII) present in the composition, preferably a liquid solution, and x is an integer ranging from 1 to 14.

In another embodiment, x in formula (VIII) is an integer from 2 to 14. The description is detailed hereafter in reference to the embodiment wherein x in formula (VIII) is an integer from 1 to 14 but the following description and all described and preferred features also apply to the embodiment wherein x, in formula (VIII), is an integer from 2 to 14.

In the remainder of the specification, embodiments concerning a surfactant liquid solution will be described in more detail.

Preferably, the compounds of formula (VIII), in which y is higher than 6, are present in an amount of less than 5% by weight, preferably less than 2% by weight, and more preferably 0%, relative to the weight of compounds (VIII) present in the composition. Preferably, the liquid solution does not comprise surfactants other than those of formula VIII.

In another embodiment, the surfactant-containing composition does not comprise any compounds of formula (VIII), in which y=10.

Preferably, the compounds of formula (VIII), in which x ranges from 1 to 4, are present in an amount of at least 50% by weight, preferably at least 60% by weight, relative to the weight of compounds (VIII) present in the composition.

Preferably, the compounds of formula (VIII), in which x ranges from 1 to 5, are present in an amount of at least 70% by weight, preferably at least 80% by weight, relative to the weight of compounds (VIII) present in the composition.

As is well-known from the person skilled in the art, the weights corresponding to each of the fractions defined by the (x, y) couples may be determined through HPLC, coupled to a mass spectrometry.

Thus, the present invention relates to an optical article, preferably a lens for spectacles, comprising a substrate provided with a first coating and, directly contacting this first coating, an antifog coating precursor coating, characterized in that the antifog coating precursor coating:
  is obtained through the grafting of at least one organosilane compound possessing:
    a polyoxyalkylene group, and
    at least one silicon atom bearing at least one hydrolyzable group,
  has preferably a thickness lower than or equal to 5 nm,
  has preferably a static contact angle with water of more than 10° and of less than 50°,
and is further coated with a film obtained by applying the composition, preferably the surfactant liquid solution such as previously defined and forming an antifog coating, having preferably a static contact angle with water lower than or equal to 10°, more preferably lower than or equal to 5°.

In the present application, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coatings may be arranged between the substrate/coating and the coating in question (however, it is preferably in contact with said substrate/coating), and (iii) does not necessarily completely cover the substrate/coating. When "a layer 1 is arranged under a layer 2", it is intended to mean that layer 2 is more distant from the substrate than layer 1.

As used herein, an "antifog coating" is intended to mean a coating which, when a transparent lens substrate coated with such coating is placed under conditions generating fog onto said substrate being devoid of said coating, enables to immediately attain a visual acuity>6/10 for an observer looking through a coated lens at a visual acuity scale located at a distance of 5 meters. Several tests to evaluate the antifogging properties of a coating are described in the experimental section. Under fog generating conditions, antifog coatings may either not present fog on their surface (ideally no visual distortion, or visual distortion but visual acuity>6/10 under the hereabove mentioned measurement conditions), or may present some fog on their surface but yet enable, despite the vision perturbation resulting from fog, a visual acuity>6/10 under the hereabove mentioned measurement conditions. A non-antifog coating does not allow a visual acuity>6/10 as long as it is exposed to conditions generating fog and generally presents a condensation haze under the hereabove mentioned measurement conditions.

As used herein, an "antifog optical article" is intended to mean an optical article provided with an "antifog coating" such as defined hereabove.

Thus, the antifog coating precursor according to the invention, which is a hydrophilic coating, is not considered as being an antifog coating according to the present invention, even if it has some antifogging properties, which may be observed for example by means of a breath test described in the experimental section. Indeed, this antifog coating precursor does not allow to obtain a visual acuity>6/10 under the hereabove mentioned measurement conditions.

As used herein, a temporary antifog coating is intended to mean an antifog coating obtained after having applied the liquid solution containing the surfactant of formula (VIII) onto the surface of the precursor coating of said antifog coating. The durability of a temporary antifog coating is generally limited by the wiping operations performed on the surface thereof, the surfactant molecules being not permanently attached to the surface of the coating but just adsorbed for a more or less durable period of time.

The optical article prepared according to the invention comprises a substrate, preferably transparent, having front and rear main surfaces, at least one of said main surfaces being provided with a coating preferably comprising silanol groups on the surface thereof, preferably on both main surfaces. As used herein, the rear face (generally concave) of the substrate is intended to mean the face which, when using the article, is the nearest from the wearer's eye. On the contrary, the front face (generally convex) of the substrate, is the face which, when using the article, is the most distant from the wearer's eye.

Although the article according to the invention may be any optical article that may encounter a problem of fog formation, such as a screen, a glazing for the automotive industry or the building industry, or a mirror, it is preferably an optical lens, more preferably an ophthalmic lens, for spectacles, or a blank for optical or ophthalmic lenses.

This excludes articles such as intraocular lenses which are in contact with living tissues or contact lenses, which do not intrinsically face the problem of fog formation, as opposed to lenses for spectacles.

According to the invention, the coating comprising silanol groups on its surface may be formed on at least one of the main surfaces of a bare substrate, that is to say a non coated substrate, or on at least one of the main surfaces of a substrate that has already been coated with one or more functional coatings.

The substrate for the optical article according to the invention may be a mineral or an organic glass, for example of a thermoplastic or thermosetting plastic material.

Especially preferred classes of substrates include poly (thiourethanes), polyepisulfides and resins resulting from the polymerization or (co)polymerization of alkyleneglycol bis allyl carbonates. These are sold, for example, under the trade name CR-39® by the PPG Industries company (ORMA® lenses, from ESSILOR).

In some applications, it is preferred that the substrate's main surface be coated with one or more functional coatings prior to depositing the coating comprising silanol groups on its surface. These functional coatings traditionally used in optics may be, without limitation, an impact-resistant primer layer, an abrasion-resistant and/or a scratch-resistant coating, a polarized coating, a photochromic coating or a tinted coating, particularly an impact-resistant primer layer coated with an abrasion-resistant and/or a scratch-resistant layer.

The coating comprising silanol groups on the surface thereof is preferably deposited onto an abrasion-resistant and/or a scratch-resistant coating. The abrasion-resistant coating and/or the scratch-resistant coating may be any layer traditionally used as an abrasion-resistant coating and/or scratch-resistant coating in the ophthalmic lenses field.

The abrasion-resistant and/or scratch-resistant coatings are preferably hard coatings based on poly(meth)acrylates or silanes comprising generally one or more mineral fillers that are intended to improve the hardness and/or the refractive index of the coating once cured. As used herein, a (meth) acrylate is an acrylate or a methacrylate.

The abrasion-resistant coating and/or scratch-resistant hard coatings are preferably made from compositions comprising at least one alkoxysilane and/or a hydrolyzate thereof, obtained for example through hydrolysis with a hydrochloric acid solution, and optionally condensation and/or curing catalysts and/or surfactants.

Recommended coatings of the present invention include coatings based on epoxysilane hydrolyzates such as those described in the patents EP 0614957, U.S. Pat. No. 4,211, 823 and U.S. Pat. No. 5,015,523.

The thickness of the abrasion-resistant coating and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product.

This coating may be any impact-resistant primer layer traditionally used for articles in a transparent polymer material, such as ophthalmic lenses.

Preferred primer compositions may be chosen from those described in WO 2011/080472, which is hereby incorporated by reference.

Preferred primer compositions are compositions based on polyurethanes and compositions based on latexes, particularly polyurethane type latexes and poly(meth)acrylic latexes, and their combinations. Primer layers generally have thicknesses, after curing, ranging from 0.2 to 2.5 μm, preferably ranging from 0.5 to 1.5 μm.

The coating comprising silanol groups on the surface thereof will be described hereafter. As used herein, a coating comprising silanol groups on the surface thereof is intended to mean a coating which naturally comprises silanol groups on the surface thereof or a coating which silanol groups have been created after having been submitted to a surface activation treatment. This coating is therefore a coating based on siloxanes or silica, for example, without limitation, a silica-based layer, a sol-gel coating, based on organosilane species such as alkoxysilanes, or a coating based on silica colloids. The first coating, preferably comprising silanol groups at its surface, may be especially an abrasion-resistant and/or scratch-resistant coating, or, according to the preferred embodiment, a monolayered antireflective coating or a multilayered antireflective coating which outer layer has silanol groups on the surface thereof. As used herein, the outer layer of a coating is intended to mean the layer that is the most distant from the substrate.

The surface activating treatment generating the silanol groups or at least increasing their proportion on the surface of a coating is generally performed under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acidic or basic treatment and/or a solvent-based treatment (water, hydrogen peroxide or any organic solvent). Many of these treatments may be combined.

As used herein, energetic species (and/or reactive species) are intended to mean especially ionic species with an energy ranging from 1 to 300 eV, preferably from 1 to 150 eV, more preferably from 10 to 150 eV, and even more preferably from 40 to 150 eV. The energetic species may be chemical species such as ions, radicals or species such as photons or electrons.

The activating treatment may also be an acidic or a basic chemical surface treatment, preferably a wet treatment or a treatment using a solvent or a combination of solvents.

The coating comprising silanol groups on the surface thereof is preferably a low refractive index layer based on silica (comprising silica), most preferably it consists in a silica-based layer ($SiO_2$), generally obtained through vapor phase deposition.

Said layer based on $SiO_2$ may comprise, in addition to silica, one or more other materials traditionally used for making thin layers, for example one or more materials selected from dielectric materials described hereafter in the present specification. This layer based on $SiO_2$ is preferably free of $Al_2O_3$.

The inventors observed that it is not essential to carry out a surface treatment when the layer is a layer based on silica, particularly when obtained through evaporation.

The coating comprising silanol groups on the surface thereof preferably comprises at least 70% by weight of $SiO_2$, more preferably at least 80% by weight and even more preferably at least 90% by weight of $SiO_2$. As has already been noticed, in a most preferred embodiment, it comprises 100% by weight of silica.

The coating comprising silanol groups on the surface thereof may also be a sol-gel coating based on silanes such as alkoxysilanes, for example tetraethoxysilane or organosilanes such as γ-glycidoxypropyl trimethoxysilane. Such a coating is obtained through wet deposition, by using a liquid composition comprising a hydrolyzate of silanes and optionally colloidal materials with a high (>1.55, preferably >1.60, more preferably > to 1.70) or a low (≤1.55) refractive index. Such a coating which layers comprise an organic/inorganic hybrid matrix based on silanes wherein colloidal materials are dispersed to adjust the refractive index of each layer are described for example in the patent FR 2858420.

In one embodiment of the invention, the coating comprising silanol groups on the surface thereof is a layer based on silica deposited onto an abrasion-resistant coating, preferably deposited directly onto this abrasion-resistant coating.

Said layer based on silica (comprising silica) is preferably a silica-based layer, generally obtained through chemical vapor deposition. It has preferably a thickness lower than or equal to 500 nm, more preferably ranging from 5 to 20 nm, and even more preferably from 10 to 20 nm.

Preferably, the deposition of said layer based on silica is carried out by regulating the pressure, which means by adding gas to the deposition chamber, the gas being in a non ionic form, preferably by adding oxygen, at a pressure ranging typically from $5 \cdot 10^{-5}$ to $5 \cdot 10^{-4}$ mbar.

In another embodiment of the invention, which is the most preferred embodiment, the optical article according to the invention comprises an antireflective coating. When such a coating is present, it generally represents the coating comprising silanol groups on the surface thereof within the meaning of the invention. This antireflective coating may be any antireflective coating traditionally used in the optics field, particularly ophthalmic optics, provided it comprises silanol groups on its surface.

An antireflective coating is defined as a coating, deposited onto the surface of an optical article, which improves the antireflective properties of the final optical article. It makes it possible to reduce the light reflection at the article-air interface over a relatively large portion of the visible spectrum.

As is also well known, antireflective coatings traditionally comprise a monolayered or a multilayered stack composed of dielectric materials. These are preferably multilayered coatings, comprising layers with a high refractive index (HI) and layers with a low refractive index (LI).

In the present application, a layer of the antireflective coating is said to be a layer with a high refractive index when its refractive index is higher than 1.55, preferably higher than or equal to 1.6, more preferably higher than or equal to 1.8 and even more preferably higher than or equal to 2.0. A layer of an antireflective coating is said to be a low refractive index layer when its refractive index is lower than or equal to 1.55, preferably lower than or equal to 1.50, more preferably lower than or equal to 1.45. Unless otherwise specified, the refractive indexes referred to in the present invention are expressed at 25° C. at a wavelength of 550 nm.

The HI and LI layers are traditional layers well known in the art, generally comprising one or more metal oxides, which may be chosen, without limitation, from the materials disclosed in WO 2011/080472.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to $SiO_2+Al_2O_3$ total weight in this layer.

Typically, HI layers have a physical thickness ranging from 10 to 120 nm, and LI layers have a physical thickness ranging from 10 to 100 nm.

Preferably, the antireflective total thickness is lower than 1 micron, more preferably lower than or equal to 800 nm and even more preferably lower than or equal to 500 nm. The antireflective total thickness is generally higher than 100 nm, preferably higher than 150 nm.

Still more preferably, the antireflective coating comprises at least two layers with a low refractive index (LI) and at least two layers with a high refractive index (HI). Preferably, the total number of layers in the antireflective coating is lower than or equal to 8, more preferably lower than or equal to 6.

HI and LI layers do not need to alternate with each other in the antireflective coating, although they also may, according to one embodiment of the invention. Two HI layers (or more) may be deposited onto each other, as well as two LI layers (or more) may be deposited onto each other.

The various layers of the antireflective coating may be deposited according to any one of the methods disclosed in WO 2011/080472, which is hereby incorporated by reference. A particularly recommended method is evaporation under vacuum.

When the coating comprising silanol groups on the surface thereof is an antireflective coating, the luminous reflection factor of an article coated with such an antireflective coating, noted $R_v$, is preferably of less than 2.5% per face of the article. The means to reach such $R_v$ values are well known from the person skilled in the art.

In the present application, the "luminous reflection factor" is such as defined in the ISO standard 13666:1998, and is measured according to ISO 8980-4 standard, that is to say it is the weighted average of the spectral reflectivity within all the visible spectrum wavelength range from 380 to 780 nm.

Prior to forming the antifog coating precursor on the coating comprising silanol groups on the surface thereof, for example an antireflective coating, it is usual to submit the surface of such coating to a physical or chemical activation treatment intended to reinforce the adhesion of the antifog coating precursor. These treatments may be selected from those previously described for activating the coating comprising silanol groups on its surface.

According to the invention, the coating comprising silanol groups on the surface thereof is directly in contact with the precursor coating of an antifog coating, which will be described hereunder.

As used herein, "a precursor of an antifog coating" is intended to mean a coating which, if a surfactant-containing liquid solution is applied on the surface thereof so as to form a film, represents an antifog coating within the meaning of the invention. The system precursor coating+surfactant-based solution film represents the antifog coating as such.

The antifog coating precursor coating is a coating having a thickness preferably lower than or equal to 5 nm, preferably of 4 nm or less, more preferably of 3 nm or less and even more preferably of 2 nm or less, possessing preferably a static contact angle with water of more than 10° and of less than 50°, which is obtained through a permanent grafting of at least one organosilane compound possessing a polyoxyalkylene group and at least one silicon atom bearing at least one hydrolyzable group.

In one embodiment of the invention, the coating is deposited by applying a composition comprising a hydrolyzate of the organosilane compound possessing a polyoxyalkylene group and at least one silicon atom carrying at least one hydrolyzable group.

It is recommended to avoid any condensation of the hydrolyzed organosilane compounds so that they can keep as much as possible the silanol functions free to react so as to facilitate the grafting of these compounds onto the surface of the optical article and to limit the formation of siloxane prepolymers before grafting. That is the reason why the deposited organosilane compound thickness is so thin.

It is therefore recommended to apply the composition relatively quickly after the hydrolysis, typically within less than 2 hours, preferably less than 1 hour, more preferably less than 30 minutes after having performed the hydrolysis (by adding a typically HCl-based, acidic aqueous solution).

Most preferably, the composition is applied less than 10 minutes, even more preferably less than 5 minutes and preferably less than 1 minute after having performed the hydrolysis.

It is preferred to conduct the hydrolysis without supplying heat, i.e. typically at a temperature of from 20 to 25° C.

As a rule, the deposition of few nanometer-thick layers requires to use very diluted compositions, with a very low dry matter content, which slows down the condensation kinetics.

The organosilane compound used is capable, thanks to its silicon-containing reactive group, to establish a covalent bond with the silanol groups present onto the surface of the coating onto which it is deposited.

The organosilane compound of the invention comprises a polyoxyalkylene chain functionalized at only one end or at both ends thereof, preferably at only one end, by a group comprising at least one silicon atom carrying at least one hydrolyzable group. This organosilane compound comprises preferably a silicon atom carrying at least two hydrolyzable groups, preferably three hydrolyzable groups. Preferably, it does not comprise any urethane group. It is preferably a compound of formula:

wherein the Y groups, being the same or different, are monovalent organic groups bound to the silicon atom through a carbon atom, the groups X, being the same or different, are hydrolyzable groups, $R^1$ is a group comprising a polyoxyalkylene function, m is an integer equal to 0, 1 or 2. Preferably m=0.

The X groups are preferably selected from alkoxy groups —O—$R^3$, particularly $C_1$-$C_4$ alkoxy groups, acyloxy groups —O—C(O)$R^4$ where $R^4$ is an alkyl radical, preferably a $C_1$-$C_6$ alkyl radical, preferably a methyl or an ethyl, halogens such as Cl, Br and I or trimethylsilyloxy $(CH_3)_3SiO$—, and combinations of these groups. Preferably, the groups X are alkoxy groups, and particularly methoxy or ethoxy groups, and more preferably ethoxy groups.

The Y group, present when m is not zero, is preferably a saturated or unsaturated hydrocarbon group, preferably a $C_1$-$C_{10}$ and more preferably a $C_1$-$C_4$ group, for example an alkyl group, such as a methyl or an ethyl group, a vinyl group, an aryl group, for example an optionally substituted phenyl group, especially substituted by one or more $C_1$-$C_4$ alkyl groups. Preferably Y represents a methyl group.

In a preferred embodiment, the compound of formula I comprises a trialkoxysilyl group such as a triethoxysilyl or a trimethoxysilyl group.

The polyoxyalkylene group of the organosilane compound (group $R^1$) comprises preferably less than 80 carbon atoms, more preferably less than 60 carbon atoms, and even more preferably less than 50 carbon atoms. Most preferably, the polyoxyalkylene group comprises less than 40 carbon atoms and more preferably less than 30 carbon atoms. The most preferred compounds have a polyoxyalkylene group which comprise from 5 to 20 carbon atoms. The group $R^1$ preferably satisfies the same conditions.

The $R^1$ group corresponds generally to the formula -L-$R^2$ where L is a divalent group bound to the silicon atom of the compounds of formula I or II through a carbon atom, and $R^2$ is a group comprising one polyoxyalkylene group bound to the group L through an oxygen atom, this oxygen atom being included in the group $R^2$. Non limiting examples of L groups include linear or branched, optionally substituted alkyl, cycloalkylene, arylene, carbonyl, amido groups, or combinations of these groups like cycloalkylenealkylene, biscycloalkylene, biscycloalkylenealkylene, arylenealkylene, bisphenylene, bisphenylenealkylene, amido alkylene groups, amongst which for example the group $CONH(CH_2)_3$, or —$OCH_2CH(OH)CH_2$— and —NHC(O)— groups. Preferred L groups are alkyl groups (preferably linear), having preferably 10 carbon atoms or less, more preferably 5 carbon atoms or less, for example ethylene and propylene groups.

Preferred $R^2$ groups comprise a polyoxyethylene group —$(CH_2CH_2O)_n$—, a polyoxypropylene group, or combinations of these groups.

The preferred organosilanes of formula I are compounds of following formula II:

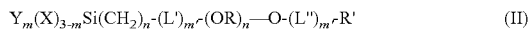

where R' is a hydrogen atom, a linear or branched acyl or alkyl group, optionally substituted by one or more functional groups, and which may furthermore comprise one or more double bonds, R is a linear or branched alkyl group, preferably linear, for example an ethylene or a propylene group, L' and L" are divalent groups, X, Y and m are such as defined hereabove, n' is an integer ranging from 1 to 10, preferably from 1 to 5, n is an integer ranging from 2 to 50, preferably from 5 to 30, more preferably from 5 to 15, m' is 0 or 1, preferably 0, m" is 0 or 1, preferably 0.

The groups L' and L", when present, may be selected from divalent groups L previously described and represent preferably the group —$OCH_2CH(OH)CH_2$— or the group —NHC(O)—. In this case, the groups —$OCH_2CH(OH)CH_2$— or —NHC(O)— are linked to the adjacent groups $(CH_2)_{n'}$ (with a group L') and R' (with a group L") through their oxygen atom (for the group —$OCH_2CH(OH)CH_2$—) or through their nitrogen atom (for the group —NHC(O)—).

In one embodiment, m=0 and the hydrolyzable groups X represent methoxy or ethoxy groups. n' is preferably 3. In another embodiment, R' represents an alkyl group possessing less than 5 carbon atoms, preferably a methyl group. R' may also represent an aliphatic or aromatic acyl group, especially an acetyl group.

Lastly, R' may represent a trialkoxysilylalkylene group or a trihalogenosilylalkylene group such as a group —$(CH_2)_{n''}Si(R^5)_3$ where $R^5$ is a hydrolyzable group such as the previously defined X groups and n" is an integer such as the previously defined n' integer. An example of such a R' group is the group —$(CH_2)_3Si(OC_2H_5)_3$. In this embodiment, the organosilane compound comprises two silicon atoms carrying at least one hydrolyzable group.

In preferred embodiments, n is 3, or does range from 6 to 9, from 9 to 12, from 21 to 24, or from 25 to 30, preferably from 6 to 9.

To be mentioned as suitable compounds of formula II are for example 2-[methoxy(polyethyleneoxy)propyl]trimethoxysilane compounds of formulas $CH_3O$—$(CH_2CH_2O)_{6-9}$—$(CH_2)_3Si(OCH_3)_3$ (III) and $CH_3O$—$(CH_2CH_2O)_{9-12}$—$(CH_2)_3Si(OCH_3)_3$ (IV), marketed by Gelest, Inc. or ABCR, the compound of formula $CH_3O$—$(CH_2CH_2O)_3$—$(CH_2)_3Si(OCH_3)_3$ (VIIIa), compounds of formula $CH_3O$—$(CH_2CH_2O)_n$—$(CH_2)_3Si(OC_2H_5)_3$ where n=21-24, 2-[methoxy(polyethyleneoxy)propyl]trichlorosilanes, 2-[acetoxy(polyethyleneoxy)propyl]trimethoxysilane of formula $CH_3C(O)O$—$(CH_2CH_2O)_{6-9}$—$(CH_2)_3Si(OCH_3)_3$, 2-[acetoxy(polyethyleneoxy)propyl]triethoxysilane of formula $CH_3C(O)O$—$(CH_2CH_2O)_{6-9}$—$(CH_2)_3Si(OC_2H_5)_3$, 2-[hydroxy(polyethyleneoxy)propyl]trimethoxysilane of formula HO—$(CH_2CH_2O)_{6-9}$—$(CH_2)_3Si(OCH_3)_3$, 2-[hydroxy(polyethyleneoxy)propyl]triethoxysilane of formula HO—$(CH_2CH_2O)_{6-9}$—$(CH_2)_3Si(OC_2H_5)_3$, compounds of formulas HO—$(CH_2CH_2O)_{8-12}$—$(CH_2)_3Si(OCH_3)_3$ and HO—$(CH_2CH_2O)_{8-12}$—$(CH_2)_3Si(OC_2H_5)_3$, polypropylene-bis[(3-methyldimethoxysilyl)propyl]oxide, and compounds with two siloxane heads such as polyethylene-bis[(3-triethoxysilylpropoxy)-2-hydroxypropoxy]oxide of formula (V), polyethylene-bis[(N,N'-triethoxysilylpropyl)-aminocarbonyl]oxide of formula (VI) with n=10-15 and polyethylene-bis(triethoxysilylpropyl) oxide of formula (VII):

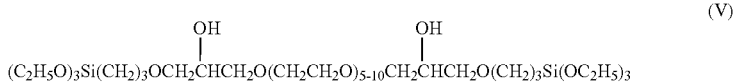

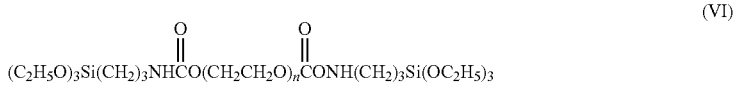

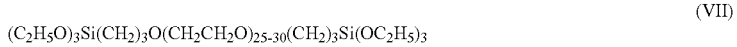

Preferred compounds of formula II are [alkoxy(polyalkylenoxy)alkyl]trialkoxysilanes or their trihalogenated analogues (m=m'=m"=0, R'=alkoxy).

Preferably, the organosilane compound of the invention has no fluorine atom. Typically, the fluorine weight ratio towards the antifog coating precursor coating is of less than 5%, preferably of less than 1% by weight and more preferably of 0%.

Preferably, the molecular weight of the organosilane compound according to the invention ranges from 400 to 4000 g/mol, preferably from 400 to 1500 g/mol, more preferably from 400 to 1200 g/mol, and even more preferably from 400 to 1000 g/mol.

Of course it is possible to graft a mixture of compounds of formula I or II, for example a mixture of compounds with different polyoxyalkylene RO chain lengths.

In one embodiment of the invention, the antifog coating precursor comprises more than 80% by weight of an organosilane compound according to the invention, relative to the antifog coating precursor total weight, preferably more than 90%, more preferably more than 95% and most preferably more than 98%. In one embodiment, the antifog coating precursor consists in a layer of said organosilane compound.

Preferably, the antifog coating precursor of the invention comprises less than 5% by weight of a metal oxide or metalloid (for example silica or alumina) relative to the coating total weight, more preferably it is free of any. When the organosilane compound used for making the antifog coating is deposited under vacuum, preferably no metal oxide is co-evaporated, according to the coevaporation method of at least one organic compound and at least one inorganic compound described in the application EP 1324078.

Preferably, the antifog coating precursor coating does not comprise any crosslinking agent, which means that it is preferably not formed from a composition comprising a crosslinking agent, for example tetraethoxysilane.

The antifog coating precursor of the invention has preferably a static contact angle with water of more than 10° and of less than 50°, preferably lower than or equal to 45°, more preferably ≤40°, even more preferably ≤30° and most preferably ≤25°. This contact angle does preferably range from 15° to 40°, more preferably from 20° to 30°.

The deposition of the organosilane compound onto the surface of the coating comprising silanol groups may be carried out according to usual procedures, preferably by gas phase deposition or liquid phase deposition, most preferably in the gas phase, by vacuum evaporation.

When the grafting is carried out in the gas phase, for example by evaporation under vacuum, it may be followed, if needed, with a step for removing the excess of the deposited organosilane compound so as to retain only the organosilane compound that is really grafted onto the surface of the silanol group-containing coating. Non grafted molecules are thus removed. Such a removal step should be preferably performed when the thickness of the antifog coating precursor initially deposited is higher than 5 nm.

However this step for removing the organosilane compound in excess can be omitted in some cases, seeing that it is possible to deposit the organosilane compound so as to form a grafted layer, that is to say once it is ensured that the deposited thickness does not exceed a few nanometers. Adjusting the deposition parameters for obtaining such thicknesses belongs to the ordinary competence of any person skilled in the art.

Nevertheless, it is preferred to form the antifog coating precursor coating by depositing some organosilane compound in excess onto the surface of the coating comprising silanol groups and thereafter removing the excess of this deposited but not grafted compound. Indeed, the inventors observed that when a layer of grafted organosilane compound is directly formed with a thickness lower than or equal to 5 nm, which does not require any removal of organosilane compound in excess, it is sometimes possible to obtain a precursor coating of an antifog coating, the surface of which has not a sufficient affinity towards a liquid solution comprising at least one surfactant, which would lead to a coating not having the desired antifogging properties.

Surprisingly, this is not observed when the organosilane compound is deposited in excess, as previously indicated, and such excess is removed later on. The actual physical thickness of the organosilane compound layer deposited in excess is preferably lower than or equal to 20 nm.

Removing the organosilane compound deposited in excess may be performed by rinsing (wet process) using for example a soapy water-based solution and/or by wiping (dry process). Preferably, the removal step comprises a rinsing operation followed with a wiping operation.

Preferably, the rinsing operation is performed by cleaning the article with some soapy water (comprising a surfactant) using a sponge. Thereafter a rinsing operation is performed with deionized water, and optionally, the lens is thereafter submitted to a wiping operation for typically less than 20 seconds, preferably 5 to 20 seconds, by means of a CEMOI™ or Selvith™ cloth impregnated with alcohol, typically isopropyl alcohol. Another rinsing operation with deionized water may then be repeated, then a wiping operation with a wiping cloth. All these steps may be carried out manually or be partially or fully automated.

The step of removing the organosilane compound in excess leads to an organosilane compound layer having generally and preferably a thickness of 5 nm or less. In this case, the organosilane compound deposited onto the surface of the optical article forms a monomolecular or a quasi-monomolecular layer.

The organosilane compound may be beforehand dissolved in a solvent prior to being evaporated, for better controlling the evaporation rate and the deposition rate. The thickness of the film may be controlled in this way thanks to this dissolution and by adjusting the amount of solution to be evaporated.

When the grafting is carried out using a wet process, for example by dipping or spin-coating, it is generally not necessary to perform a step for removing the organosilane compound deposited in excess.

The antifog coating precursor coating according to the invention has a low roughness. Typically, for an organosilane compound deposited by vapor phase, the roughness mean value Ra is lower than 2 nm, typically of about 1 nm. Ra is such as defined in WO 2011/080472.

A temporary antifog coating according to the invention is obtained by depositing onto the antifog coating precursor coating a film of a composition, preferably a liquid solution, comprising at least one surfactant of formula $F(CF_2)_y$—$(CH_2$—$CH_2O)_{x+1}H$ (VIII), wherein y is an integer lower than or equal to 10, compounds of formula (VIII), wherein y=6, accounting for at least 90% by weight, preferably at least 95%, more preferably 100% by weight of compounds of formula (VIII) present in the composition, x is an integer ranging from 1 to 14, and in another embodiment from 2 to 14.

This solution provides the optical article, preferably a lens for spectacles with an antifog temporary protection by creating on their surface a uniform layer that contributes to disperse the water droplets on the surface of the optical article so that they do not form any visible fog.

Applying the surfactant solution may be performed by any known method, especially by dipping or spin-coating.

The surfactant solution is preferably applied by depositing a drop of this solution onto the surface of the antifog coating precursor and then by spreading it so as to cover preferably the whole precursor coating.

The surfactant solution applied is generally an aqueous solution, comprising preferably from 0.5 to 15%, more preferably from 2 to 8% by weight of surfactants having formula VIII, relative to the weight of the liquid solution. The solution may also comprise alcohols, such as ethanol or isopropyl alcohol, in an amount generally of less than 10% by weight.

The surfactant composition based on compounds of formula (VIII) being surprisingly significantly more efficient to provide long-lasting antifogging properties, it may be employed in reduced amounts as compared to surfactants of the prior art, typically in amounts ranging from 2 to 5% by weight, more preferably from 2 to 4% by weight, relative to the weight of the composition.

In more preferred embodiments, a tissue or cloth is impregnated by the inventive surfactant-containing composition based on compounds of formula (VIII) and the tissue is directly used to confer antifogging properties to the optical article coated with the precursor coating by wiping it with said cloth.

There is then no need to previously deposit a drop of the surfactant solution of compounds of formula (VIII).

It has been found that a non woven tissue whose structure comprises a hydrophilic polymer and a hydrophobic polymer impregnated by the surfactant compositions based on compounds of formula (VIII) provides superior results in terms of transparency and durability.

An example of such a tissue is the tissue "wetlaid" manufactured by the Ahlstrom company.

Indeed, without wishing to be limited by a theory, the inventors think that the hydrophilic polymer on one side absorbs the surfactant composition and is able to make a reservoir effect and the hydrophobic polymer on the other side releases the surfactant composition.

A preferred hydrophilic polymer is a polymer comprising cellulosic units.

It is also preferred to use a surfactant aqueous composition as described previously comprising a monofunctional alcohol and a difunctional alcohol, said monofunctional alcohol having preferably a lower molecular weight than said difunctional alcohol.

The monofunctional alcohol comprises one single hydroxy group, typically ethanol or isopropyl alcohol. The difunctional alcohol comprises only two hydroxy groups. An example of a particularly preferred difunctional alcohol is propylene glycol (propane-1, 2-diol).

The invention also relates to a non woven wet tissue whose structure comprises a hydrophilic polymer, preferably a hydrophilic polymer comprising cellulosic units, and a hydrophobic polymer, said tissue being impregnated by a surfactant-containing composition based on compounds of formula (VIII) such as described hereabove.

In another preferred embodiment, the application of the surfactant containing composition onto said precursor coating is made by wiping the optical article coated with said precursor coating with a dry microfiber tissue, said dry microfiber tissue having been obtained by Impregnation, with a surfactant containing composition based on compounds of formula (VIII) such as described hereabove, of a microfiber tissue comprising microfibers made of polymers comprising polyester units and polyamide units, followed by a drying step.

The microfiber tissue used in the invention preferably comprises microfibers of polyester and microfibers of polyamide and/or microfibers comprising a polyester/polyamide copolymer.

As known in the art, a microfiber tissue or cloth is made of microfibers. A microfiber is a fiber with less than 1.3 Decitex (Dtex) per filament, preferably less than 1 Decitex per filament. Decitex is a measure of linear density and is commonly used to describe the size of a fiber or filament. Ten thousand meters of a 1-decitex fiber weighs one gram. In a microfiber tissue, fibers are combined to create yarns, which are knitted or woven in a variety of constructions.

An example of a preferred microfiber tissue comprising microfibers made of polymers comprising polyester units and polyamide units is the CEMOI™ tissue (manufacturer: KB SEIREN Company—retailer: Facol) whose composition is polyester 70%/Nylon™ 30% and that is commonly used for cleaning lenses. The microfiber tissue described above is generally impregnated by the surfactant containing composition using impregnation pad(s).

The purpose of the drying step in the preparation of the dry microfiber tissue is to remove solvents present in the surfactant containing composition. It is generally a heating step. The heating step preferably comprises heating at a temperature ranging from 60° C. to 200° C., more preferably from 80° C. to 150° C.

After the heating step, the microfiber tissue comprising microfibers made of polymers comprising polyester units and polyamide units is dry and the weight content of surfactants of formula (VIII) impregnating said microfiber tissue preferably ranges from 10% to 45%, more preferably 14% to 40%, even better from 20 to 40% and optimally from 20% to 30% relative to the total weight of the dry impregnated microfiber tissue (tissue and surfactant). In addition, compounds of formula (VIII) in which y=6 are present in an amount of at least 90% by weight, preferably at least 95%, more preferably 100% by weight, relative to the weight of compounds (VIII) in the impregnated microfiber tissue.

It has been determined that, surprisingly, the dry microfiber tissue comprising microfibers made of polymers comprising polyester units and polyamide units having been impregnated by the surfactant containing composition based on surfactants of formula (VIII) is still able to remove smudges from the surface of optical articles, while providing at the same time antifogging properties with long lasting effect.

The invention also relates to a dry microfiber tissue which has been prepared by impregnation, with a surfactant containing composition based on compounds of formula (VIII), of a microfiber tissue comprising microfibers made of polymers comprising polyester units and polyamide units, followed by a drying step. Said dry microfiber tissue comprising microfibers made of polymers having polyester and polyamide units is thus impregnated with at least one surfactant of formula (VIII), where compounds of formula (VIII) in which y=6 are present in an amount of at least 90% by weight, preferably at least 95%, more preferably 100% by weight, relative to the weight of compounds (VIII) impregnated in the microfiber tissue.

The surfactant solution reduces the static contact angle with water of the surface of the optical article, especially of a spectacle lens. The antifog coating of the invention preferably has a static contact angle with water lower than or equal to 10°, more preferably lower than or equal to 5°.

An immediately operational antifog coating is obtained as soon as the surfactant composition is applied, which represents one of the major advantages of the invention. Thus, it is not necessary to apply many times a surfactant solution to score the antifogging effect, as is the case with products of the prior art.

In addition, the antifogging effect provided by the antifog coating is long-lasting over time. This durability is tested during fogging and defogging cycles, in a procedure described in the experimental section.

The antifog coating is temporary but easily renewable, since it just has to be performed a new application of surfactant when there are not sufficient surfactant molecules adsorbed onto the surface of the antifog coating precursor anymore. The latter therefore remains "activable" in all circumstances.

The present invention also relates to a method for imparting antifog properties to an optical article, preferably a lens for spectacles, comprising the application of the surfactant-containing composition previously defined, which is preferably a liquid solution, onto a main surface of said optical article, and more preferably using a tissue or cloth impregnated by a surfactant composition based on surfactants of formula (VIII) such as described hereabove, and especially the non woven wet tissue or the dry microfiber tissue as described above.

Preferably, the main surface of the optical article onto which said composition is applied has a static contact angle with water of 100° or less, preferably 90° or less, more preferably of more than 10° and of less than 50°. Said main surface is generally the surface of a coating applied on the substrate of the optical article, e.g. a precursor coating of an antifog coating. Preferably, said main surface is not the surface of a hydrophobic and/or oleophobic coating. Said main surface can be the uncoated surface of the optical article's substrate.

In the present disclosure, a lens does possess antifogging properties if it successfully passes the breath test. For this test, the tester places the lens to evaluate at a distance of about 2 cm from his mouth. The tester for 3 seconds blows his breath onto the exposed surface of the lens. The tester can visually observe the presence or the absence of a condensation haze/distortion.

A lens is considered as having antifogging properties if it inhibits the haze effect resulting from the fog at the end of the breath test (but it does not necessarily represent an antifog lens within the meaning of claim 1, because it may possibly present a visual distortion leading to a visual acuity<6/10).

Therefore, the method of the invention generally enables to provide antifogging properties to any type of optical article, preferably lenses for spectacles, whether the article has an antifog coating precursor coating, or not. The method is especially recommended for treating bare lenses or lenses just coated with an abrasion-resistant coating, preferably of the polysiloxane-containing type.

The present invention lastly relates to an optical article, preferably a lens for spectacles, comprising a substrate provided with a coating comprising silanol groups on the surface thereof, a part of the surface of said coating comprising silanol groups on the surface thereof directly contacting an antifog coating precursor coating such as previously defined, and another part of the surface of said coating comprising silanol groups on the surface thereof, preferably the remainder of its surface, being in direct contact with, and adhering to a hydrophobic and/or oleophobic coating. These parts may be continuous or discontinuous.

Such an optical article can especially be used as a demonstrator for showing antifogging properties, after application on the surface thereof of a liquid solution comprising at least one surfactant and/or one hydrophilic compound with no surface active properties such as previously defined, then by submitting the article to fog generating conditions (breath, refrigerator, boiling water vapor . . . ) or by submitting its surface to one or more wiping operations before being exposed to fog generating conditions.

The optical article mists on that part of the surface covered with the hydrophobic and/or oleophobic coating and remains transparent in the area comprising the antifog coating.

The hydrophobic and/or oleophobic coatings, or antisoiling top-coats that can be suitably used in this optical article are especially described in the application WO 2010/055261. They differ naturally from the antifog coatings of the invention.

The hydrophobic and/or oleophobic coatings used preferably have a surface energy lower than or equal to 14 mJ/m$^2$, preferably lower than or equal to 12 mJ/m$^2$, in accordance with the Owens Wendt method described in the article referred to in the application WO2010/055261.

Such optical articles can be manufactured according to any one of the methods disclosed in WO 2011/080472, which is hereby incorporated by reference.

The following examples illustrate the invention in a more detailed yet non limiting way.

EXAMPLES

1. Materials and Optical Articles Used

Silica is used in the form of granules provided by the Optron Inc. company. The organosilane compound used in the examples to form the antifog coating precursor is 2-[methoxy(polyethyleneoxy)propyl]trimethoxysilane comprising from 6 to 9 ethylene oxide units, of formula (III) and with a molecular weight 450-600 g/mol (CAS No.: 65994-07-2. Ref: SIM6492.7, provided by the Gelest, Inc. company).

The lens used comprises a lens substrate in an ORMA® material, comprising a polyurethane-based impact-resistant primer with a thickness of about 1 micron, itself provided with an abrasion-resistant coating with a thickness of about 3 microns by depositing and curing a composition such as defined in example 3 of the patent EP 0614957, coated in turn with a five-layer antireflective coating $ZrO_2/SiO_2/ZrO_2/ITO/SiO_2$ (noted antireflective coating Y) deposited onto the abrasion-resistant coating by evaporation under vacuum of the materials in the order in which they are mentioned (respective thicknesses of the layers: 29, 23, 68, 7 and 85 nm). An ITO layer is an electrically conductive layer of indium oxide doped with tin ($In_2O_3$:Sn).

These lenses are treated on both faces according to the methods described hereafter, the concave face being treated before the convex face.

In the examples, the antireflection coating is not submitted to any activating treatment prior to depositing the antifog coating precursor.

2. Vapor Deposition of the Antifog Coating Precursor

In the examples, the deposition is carried out on the antireflective coating Y of a lens by evaporation under vacuum using a Joule effect-based heating source.

The siloxane compound of formula III is poured in a copper capsule (in the absence of any porous material), and this capsule is deposited onto a heating support in conductive tantalum. The evaporating device is a SATIS 1200 DLF or BALZERS BAK apparatus. The evaporation pressure of the siloxane compound of formula III does generally vary from $5 \cdot 10^{-6}$ to $8 \cdot 10^{-6}$ mbar for SATIS 1200 DLF. Once the evaporation is completed, the surface of each lens is rinsed with some soapy water, optionally with isopropyl alcohol, then deionized water and wiped with a Cémoi™ dry cloth so that the excess of siloxane compound of formula III deposited be removed.

The Cémoi™ cloth is a cloth provided by the Facol supplier/retailer under the reference Microfibre M 840 S (30×40).

3. Application of a Surfactant-Containing Liquid Solution (Temporary Antifog Solution)

3.1 Preparation of Surfactant Solutions

Two different surfactants were used:

Capstone® FS 3100 is the surfactant used for preparing the surfactant solutions of the invention.

Capstone® FS 3100 is a surfactant comprising a compound of general formula $F(CF_2)_y$—$(CH_2$—$CH_2O)_{x+1}H$ (VIII) for which more than 90% by weight corresponds to the fraction y=6 (even more than 95% by weight), x being an integer ranging from 1 to 14. In other words, Capstone® FS3100 is a mixture of compounds having polyethoxylated chains of variable length, but a fluorinated chain of constant length (y=6).

Capstone® FS3100 contains trace amounts of compounds of formula (VIII) in which y is higher than 6 (as impurities), which are not detectable through HPLC. The distribution of the ethoxy group as determined by HPLC-MS in the mixture of Capstone® FS 3100 compounds is as follows:

| | | | x | | | | | | |
|---|---|---|---|---|---|---|---|---|---|
| | 1 and 2 | 3 | 4 | 5 | 6 | 7 | 8 | 9 | 10 |
| Weight % | 28.2 | 20.5 | 19.1 | 14.65 | 9.35 | 4.95 | 2.2 | 0.85 | 0.2 |

Zonyl® FSO 100 (from DuPont) is used as a comparative surfactant. Zonyl® FSO 100 is a mixture of compounds of formula (VIII) wherein y is equal to 6, 8 and 10 with weight amounts respectively of about 65%, 30% and 5%, and x is an integer ranging from 2 to 13.

A solution is prepared for each surfactant: the surfactant is dissolved in a mixture of deionized water and isopropyl alcohol (IPA), so as to obtain an aqueous solution containing 2.5% by weight of IPA and 6% by weight of surfactant.

3.2. Deposition of the Solution onto Lenses

The lenses provided with an antifog coating precursor coating prepared under 2 were treated by means of the solutions described under 3.1.

Each solution is applied as follows:
1. Stir the solution vial before use.
2. Hold the lens between the thumb and the forefinger and apply 2 drops of the surfactant solution on the center of the convex face of the lens.
3. Using a clean Cémoi™ cloth (supplier Facol Microfibre M 840 S (30×40), spread the drops with the fingertip over all of the lens surface without rubbing (max 7 seconds).
4. Perform the same operation with the concave face of the lens.
5. Allow drying for 5 to 10 seconds and control the lens, as for transmission only, under the ambient light (ceiling light consisting in a neon tube), by keeping the lens at a distance from the eye of from 30 to 50 cm.
6. Using another clean Cémoi™ cloth, wipe the edge of the lens.
7. Remove the white marks which are visible in transmission, the Cémoi™ cloth being held with the forefinger tip, without strongly rubbing. The lens should be clean and devoid of any white mark over its entire surface.

The method makes it possible to obtain a perfectly transparent ophthalmic lens.

4. Hot Vapor Test

All the vapor tests have been carried out on a 10 lens-panel: 5 pairs (or couples) of lenses, each pair comprising one lens according to the invention (lens treated with the solution with 6% by weight of Capstone® FS 3100) and one comparative lens (lens treated with the solution with 6% by weight of Zonyl® FSO 100).

Before the test, the lenses are placed for 24 hours in a temperature-regulated environment (20-25° C.) and under 40 to 50% humidity.

For the test, the lenses are placed for 15 seconds above a heated container containing water at 52° C. Immediately after, a visual acuity scale located at a distance of 5 m is observed through the tested lens. The observer evaluates the visual acuity as a function of time and according to following criteria:

0. No fog, no visual distortion (visual acuity=10/10)
1. Fog and/or visual distortion allowing a visual acuity>6/10
2. Fog and/or visual distortion allowing a visual acuity<6/10

In practical terms, to obtain the score 0 or 1, a wearer having a vision of 10/10 and having placed the lens in front of his eye should be able to distinguish the orientation of the "E" letters on the 6/10 line of the Snellen optotype table placed at a distance of 5 meters.

This test makes it possible to simulate the ordinary living conditions where a wearer leans his face towards a cup of tea/coffee or towards a pan filled with boiling water.

If the lenses obtain a score of 0 or 1, they are submitted to a new vapor test after having controlled under a Waldmann lamp that they were totally dry.

The test is repeated for each couple of lenses until each lens obtains a score 2, meaning that it failed in the vapor test.

The results are given in the following table (Table 1):

| | Stress number at which Zonyl® FSO100 obtains the score 1 | Stress number at which Capstone® FS-3100 obtains the score 1 | Stress number at which Zonyl® FSO-100 obtains the score 2 (failure) | Stress number at which Capstone® FS-3100 obtains the score 2 (failure) |
|---|---|---|---|---|
| Couple 1 | 6 | 34 | 27 | 40 |
| Couple 2 | 10 | 32 | 26 | 38 |
| Couple 3 | 22 | 14 | 28 | 28 |
| Couple 4 | 24 | 30 | 43 | 38 |
| Couple 5 | 21 | 37 | 39 | 39 |

An improvement in the durability towards vapor test could be noticed with the solution based on Capstone® FS-3100 for 3 to 4 of the 5 treated lenses (stress number increased up to 40%), which is particularly important and surprising. For the other lenses, the performances of both surfactants are comparable.

5. Tests Under Winter and Tropical Conditions

These tests were performed using the system for determining the antifog performance of transparent optical articles that is fully described in French patent application n° 11.53814 filed on May 4, 2011, and represented on FIG. 1 of said patent application, where it is labeled (20).

A lens passes the test when obtaining a sharpness coefficient N≥0.6. A lens failed in this test when obtaining a sharpness coefficient N<0.6. The sharpness coefficient N is defined in French patent application n° 11.53814.

a) Winter Conditions

In this test, the lenses provided with an antifog coating precursor coating prepared under 2 and further treated as described in 3.2 by means of the solutions described under 3.1 (or with the commercial Defog It™ solution) were stored for 60 minutes under "winter conditions" (4° C., 40% humidity) and were then rapidly subjected to normal conditions (20° C., 50% humidity). The results are shown below: (Table 2)

TABLE 2

| Surfactant | No wiping | 10 wipings | 30 wipings |
|---|---|---|---|
| Defog it™ | All pass | All pass | 1 pass, 1 fail |
| Zonyl® FSO-100 (2 lenses) | All pass | All pass | 1 pass, 1 fail |
| Capstone® FS 3100 (5 lenses) | All pass | All pass | All pass | b) Tropical Conditions

In this test, the lenses provided with an antifog coating precursor coating prepared under 2 and further treated by means of the solutions described under 3.1 (or with the commercial Defog It™ solution) were stored for 30 minutes under normal conditions (20° C., 45% humidity) and were then rapidly subjected to "tropical conditions" (30° C., 70% humidity). The results are shown below:

TABLE 3

| Surfactant | No wiping | 10 wipings | 30 wipings | 50 wipings |
|---|---|---|---|---|
| Defog it™ | All pass | All pass | All pass | All pass |
| Zonyl® FSO-100 (2 lenses) | 1 pass, 1 fail | All fail | All fail | All fail |

TABLE 3-continued

| Surfactant | No wiping | 10 wipings | 30 wipings | 50 wipings |
|---|---|---|---|---|
| Capstone® FS 3100 (5 lenses) | All pass | All pass | All pass | 3 pass, 1 fail |

It can be concluded from these two series of tests that Capstone® FS-3100 (6% by weight) is superior to Zonyl® FSO-100 (6% by weight) in terms of antifog performance, and comparable to the Defog It™ commercial solution.

6. Durability of the Antifogging Effect after a Mechanical Stress (after Application of a Surfactant Solution This test enables to evaluate the resistance to wiping of the temporary anti-fog solution onto the surface of the lenses. It was carried out on several couple of lenses (2 lenses). The general test protocol is described in §5 of the experimental part of WO 2011/080472.

Each couple of lenses was initially subjected to a series of 5 wipings, then 10, 10, 10, 20, 20 and 20 additional wiping operations were performed. Briefly, a hot vapor test followed by a drying step is carried out between each series of wipings. The test was generally stopped when at least one lens of a couple yielded a low score.

Here, a wiping operation corresponds to one moderately marked rotation of a wiping cloth Cémoi™ on both faces of the lens (the lens is pressed between the thumb and the forefinger).

The antifog scores (A, B, C or D) correspond to the fog level at the end of each hot vapor test, after implementation of the corresponding number of wiping operations (cumulated number):

A: Homogeneous water film (acuity 10/10)

B: Visual distortion considered as acceptable by the wearer

C: Visual distortion considered as not acceptable by the wearer (heterogeneous water film)

D: Totally diffusing white haze, fine water drops.

The lenses are considered as having successfully passed the durability test if they obtained a score A or B.

Lenses G1 are lenses according to claim 1 having an antireflection coating and a precursor coating of an antifog coating. Lenses G1 are provided with an antifog coating precursor coating prepared under 2 and further treated as described in 3.2 by means of the solutions described under 3.1, or similar solutions with a lower (3% wt) or higher (15% wt) amount of surfactant, keeping the amount of isopropyl alcohol at 2.5%.

Lenses G2 are lenses without antireflection coating and without precursor coating of an antifog coating. Lenses G2 are identical to those described in §1, except that no antireflection coating was deposited onto the abrasion-resistant coating. The solutions described under 3.1 were directly deposited onto said abrasion-resistant coating, as described in 3.2.

The results are shown in the tables hereunder:

TABLE 4

| Couple n° | Type of lens | Surfactant containing solution | Antifog score after X (cumulated) wiping operations with X = | | | | | | | |
|---|---|---|---|---|---|---|---|---|---|---|
| | | | 0 | 5 | 15 | 25 | 35 | 55 | 75 | 95 |
| 1', 2' | G1 | Zonyl ® 6% | A | A | A | A | A | A | A | A |
| | G1 | Capstone ® FS3100 3% | A | A | A | A | A | A | A | A |
| 3' | G1 | Zonyl ® 6% | A | A | A | A | A | B | C | |
| | G1 | Capstone ® FS3100 3% | A | A | A | A | A | A | | |
| 4' | G1 | Zonyl ® 6% | A | A | A | B | C | C | | |
| | G1 | Capstone ® FS3100 3% | A | A | A | A | A | A | | |
| 5' | G1 | Zonyl ® 6% | B | C | C | C | | | | |
| | G1 | Capstone ® FS3100 3% | A | A | A | A | | | | |
| 6', 7', 8', 9' | G1 | Zonyl ® 6% | A | A | A | A | A | A | A | A |
| | G1 | Capstone ® FS3100 6% | A | A | A | A | A | A | A | A |
| 10' | G1 | Zonyl ® 6% | A | A | A | A | A | A | A | |
| | G1 | Capstone ® FS3100 6% | A | A | A | A | A | A | B | C |
| 11' | G1 | Zonyl ® 6% | A | A | A | A | A | A | A | |
| | G1 | Capstone ® FS3100 15% | A | A | A | A | A | A | A | |
| 12' | G1 | Zonyl ® 6% | A | A | A | A | A | A | C | |
| | G1 | Capstone ® FS3100 15% | A | A | A | A | A | B | C | |
| 13' | G1 | Zonyl ® 6% | A | A | A | A | A | A | B | |
| | G1 | Capstone ® FS3100 15% | A | A | A | A | A | B | C | |
| 14' | G1 | Zonyl ® 6% | A | A | A | A | A | A | B | |
| | G1 | Capstone ® FS3100 15% | A | A | A | A | A | A | B | |
| 15' | G1 | Zonyl ® 6% | A | A | A | A | A | B | C | |
| | G1 | Capstone ® FS3100 15% | A | A | A | A | A | A | C | |

TABLE 5

| Couple n° | Type of lens | Surfactant containing solution | Antifog score after X (cumulated) wiping operations with X = | | | | | | |
|---|---|---|---|---|---|---|---|---|---|
| | | | 0 | 5 | 15 | 25 | 35 | 55 | 75 |
| 1" | G2 | Zonyl ® FSO-100 6% | A | A | A | A | B | D | |
| | G2 | Capstone ® FS3100 6% | B | B | A | A | B | C | |
| 2" | G2 | Zonyl ® FSO-100 6% | A | A | A | A | A | C | D |
| | G2 | Capstone ® FS3100 6% | A | B | A | A | B | A | A |
| 3" | G2 | Zonyl ® FSO-100 6% | A | A | C | C | | | |
| | G2 | Capstone ® FS3100 6% | A | A | B | B | | | |
| 4" | G2 | Zonyl ® FSO-100 6% | A | A | A | B | B | D | |
| | G2 | Capstone ® FS3100 6% | A | A | A | A | A | A | |
| 5" | G2 | Zonyl ® FSO-100 6% | A | A | A | A | A | D | |
| | G2 | Capstone ® FS3100 6% | A | A | A | A | A | A | |

For lenses G1, it can be seen that the durability of antifog performance of Capstone® FS-3100 at 3% by weight after a mechanical stress is almost equivalent to that of Zonyl® FSO-100 at 6% by weight. Both surfactants exhibit similar antifog performances when used at a weight content of 6%.

For lenses G2, Capstone® FS-3100 is more effective than Zonyl® FSO-100 at a weight content of 6%. However, the durability of the antifogging effect is lower due to the absence of precursor coating of an antifog coating on lenses G2.

7. Evaluation of Additional Lenses and Cosmetic Aspect of the Lenses

Lens G1 is the lens according to claim 1 that has been defined in §6. Lens G3 is the antifog spectacle lens commercialized by Seiko, which comprises a substrate having a refractive index of 1.6 and a precursor coating of an antifog coating. Lens G4 is the antifog spectacle lens commercialized by Tokai, which comprises a substrate having a refractive index of 1.6 and a precursor coating of an antifog coating.

Lenses G1, G3 and G4 were further treated as described in 3.2 by means of the solution described under 3.1 comprising 6% by weight of Capstone® FS-3100.

They were subjected to one hot vapor test such as described previously (without wiping cycles), dried as in §6, and then subjected to additional hot vapor test/drying cycles. Antifog scores were given to the lenses after each hot vapor test. The results are shown in the table below (Table 6).

| Lens | Number of hot vapor tests | | | |
|---|---|---|---|---|
| | 0 | 1 | 2 | 3 |
| G1 | A | A | A | A |
| G3 | A | A | A | A |
| G4 | A | C | | |

All lenses G1, G3 and G4 after having been treated as described in 3.2 by means of the solution described under 3.1 comprising 6% by weight of Capstone® FS-3100 exhibit antifogging properties.

Lens G4 does not exhibit a satisfactory antifog effect durability with the Capstone® FS-3100 solution. Optical distortion is rapidly observed, and cosmetic aspect after fogging is not acceptable. Indeed, the lens appears whitish after deposition of the surfactant solution. After drying to evaporate the water film formed at the surface of the lens, spots appeared.

Lenses G1 and G3 demonstrate comparable antifog performance with the Capstone® FS-3100 solution. However, contrary to lens G1, cosmetic aspect after fogging of lens G3 is not acceptable. After drying to evaporate the water film formed at the surface of the lens, spots appeared.

Lens G1 did not exhibit cosmetic problems, before and after elimination of the excess of the siloxane compound of formula III, even though several wiping cycles are performed in a durability test. After deposition of the surfactant solution, the glide ability of a cloth on the surface of this lens was satisfactory and was the same using Zonyl® FSO-100 6% wt rather than Capstone® FS-3100 6% wt. Further, the speed of evaporation of the water film formed at the surface of the lens after fogging was the same for both surfactants. In both cases, homogeneity of the water film was the same.

The invention claimed is:

1. An optical article comprising a substrate having at least one main surface coated with a first coating and, directly contacting this first coating, a precursor coating of an antifog coating, wherein the coating precursor of the antifog coating is:
obtained through the grafting of at least one organosilane compound comprising:
a polyoxyalkylene group; and
at least one silicon atom bearing at least one hydrolyzable group; and
further coated with a film obtained by applying onto the precursor coating a surfactant-containing composition containing at least one surfactant of formula:

wherein x is an integer ranging from 1 to 14, y is an integer lower than or equal to 10, compounds of formula (VIII) in which y=6 are present in an amount of at least 90% by weight relative to the weight of compounds (VIII) present in said composition, so as to form an antifog coating.

2. The optical article of claim 1, wherein the polyoxyalkylene group comprises less than 80 carbon atoms.

3. The optical article of claim 1, wherein compounds of formula (VIII) in which y=6 are present in an amount of at least 95% by weight relative to the weight of compounds (VIII) present in the composition.

4. The optical article of claim 3, wherein compounds of formula (VIII) in which y=6 are present in an amount of 100% by weight relative to the weight of compounds (VIII) present in the composition.

5. The optical article of claim 1, wherein the antifog coating has a static contact angle with water lower than or equal to 5°.

6. The optical article of claim 1, wherein the compounds of formula (VIII), in which x ranges from 1 to 4, are present in an amount of at least 50% by weight, relative to the weight of compounds (VIII) present in the surfactant-containing composition.

7. The optical article of claim 1, wherein the surfactant-containing composition comprises from 0.5 to 15% by weight of surfactants of formula (VIII), relative to the weight of the composition.

8. The optical article of claim 1, wherein the compounds of formula (VIII), in which y is higher than 6, are present in an amount of less than 5% by weight, relative to the weight of compounds (VIII) present in the surfactant-containing composition.

9. The optical article of claim 8, wherein the compounds of formula (VIII), in which y is higher than 6, are present in an amount of 0%, relative to the weight of compounds (VIII) present in the surfactant-containing composition.

10. The optical article of claim 1, wherein the first coating comprises silanol groups on its surface.

11. The optical article of claim 1, wherein the coating precursor of the antifog coating has a thickness lower than or equal to 5 nm.

12. The optical article of claim 1, wherein the coating precursor of the antifog coating has a static contact angle with water of more than 10° and of less than 50°.

13. The optical article of claim 1, wherein the organosilane compound is a compound of formula:

wherein the Y groups independently, are monovalent organic groups bound to the silicon through a carbon atom, the X groups independently are hydrolyzable groups, $R^1$ is a group comprising a polyoxyalkylene group, and m is an integer equal to 0, 1 or 2.

14. The optical article of claim 1, wherein the organosilane compound comprises a polyoxyalkylene group comprising from 5 to 20 carbon atoms.

15. The optical article of claim 1, further defined as an ophthalmic lens.

16. A method for imparting antifog properties to an optical article having at least one main surface, comprising applying onto the main surface a surfactant-containing composition such as defined in claim 1, wherein the optical article comprises a substrate having at least one main surface coated with a precursor coating of an antifog coating, and wherein the coating precursor of the antifog coating is obtained through the grafting of at least one organosilane compound having:
a polyoxyalkylene group comprising carbon atoms; and
at least one silicon atom bearing at least one hydrolyzable group.

17. The method of claim 16, wherein applying the surfactant-containing composition onto the main surface comprises wiping the main surface with a non-woven tissue comprising a structure which comprises a hydrophilic polymer and a hydrophobic polymer, said tissue being impregnated with the surfactant-containing composition.

18. The method of claim 16, wherein applying the surfactant-containing composition onto the main surface comprises wiping the main surface with a dry microfiber tissue having microfibers comprising polymers comprising polyester units and polyamide units impregnated with the surfactant containing composition.

19. The method of claim 16, wherein the main surface of the optical article has a static contact angle with water of 100° or less before applying the surfactant-containing composition.

20. The method of claim 19, wherein the main surface of the optical article has a static contact angle with water of more than 10° and of less than 50° before applying the surfactant-containing composition.

21. The method of claim 16, wherein the polyoxyalkylene group comprises less than 80 carbon atoms.

* * * * *